(12) United States Patent
Itamoto

(10) Patent No.: US 11,989,617 B2
(45) Date of Patent: May 21, 2024

(54) SELECTION APPARATUS AND SELECTION METHOD

(71) Applicant: OPTOELECTRONICS CO., LTD., Saitama (JP)

(72) Inventor: Shuhei Itamoto, Saitama (JP)

(73) Assignee: OPTOELECTRONICS CO., LTD., Saitama (JP)

( * ) Notice: Subject to any disclaimer, the term of this patent is extended or adjusted under 35 U.S.C. 154(b) by 2 days.

(21) Appl. No.: 17/818,524

(22) Filed: Aug. 9, 2022

(65) Prior Publication Data

US 2023/0053371 A1 Feb. 23, 2023

(30) Foreign Application Priority Data

Aug. 19, 2021 (JP) ................. 2021-133992

(51) Int. Cl.
*G06K 7/14* (2006.01)
*G06T 5/30* (2006.01)

(52) U.S. Cl.
CPC ......... *G06K 7/1413* (2013.01); *G06K 7/1417* (2013.01); *G06T 5/30* (2013.01)

(58) Field of Classification Search
CPC ...... G06K 7/1413; G06K 7/1417; G06T 5/30; G06T 7/0002
See application file for complete search history.

(56) References Cited

U.S. PATENT DOCUMENTS

2005/0011957 A1* 1/2005 Attia ................. G06K 7/10722
235/462.46

FOREIGN PATENT DOCUMENTS

JP 2011-076517 A 4/2011

* cited by examiner

*Primary Examiner* — Matthew Mikels
(74) *Attorney, Agent, or Firm* — Shih IP Law Group, PLLC

(57) ABSTRACT

A selection apparatus capable of efficiently selecting an optimum setting condition for filtering is provided. The selection apparatus is an apparatus that selects a setting condition for filtering to be performed on a reading target. The selection apparatus includes: a determiner that determines whether the reading target is readable with each of a plurality of combinations selected from among combinations of all setting conditions for at least two types of filtering; and a selector that selects a setting condition for the filtering based on a result of the determination by the determiner.

9 Claims, 8 Drawing Sheets

SELECTION APPARATUS AND SELECTION METHOD

CROSS REFERENCE TO RELATED APPLICATIONS

This application is entitled to and claims the benefit of Japanese Patent Application No. 2021-133992 filed on Aug. 19, 2021, the disclosure of which including the specification, drawings and abstract is incorporated herein by reference in its entirety.

TECHNICAL FIELD

The present invention relates to a selection apparatus and a selection method.

BACKGROUND ART

Heretofore, reading apparatuses have been known, which perform reading on reading targets by capturing codes, such as one-dimensional codes and/or two-dimensional codes and decoding the captured images (reading targets). The reading apparatuses as described herein include an apparatus that allows an optimum capturing condition to be set by performing reading of a reading target a plurality of times and comparing results of the reading.

Patent Literature (hereinafter, referred to as "PTL" 1), for example, discloses a configuration in which capturing is performed with each of a plurality of setting conditions on combinations of a plurality of types of filtering described in a filter condition table, and an optimum capturing condition is set.

CITATION LIST

Patent Literature

PTL 1

Japanese Patent Application Laid-Open No. 2011-76517

SUMMARY OF INVENTION

Technical Problem

The number of setting conditions described in the filter condition table of PTL 1, however, increases to a large number because a plurality of stages of an intensity level is present in each of the plurality of types of filtering. For this reason, there arises a problem in that the number of times the capturing is performed for all the setting conditions increases, thus, resulting in a situation where it takes time until the optimum capturing condition (setting condition) is set.

An object of the present invention is thus to provide a selection apparatus and a selection method each capable of efficiently selecting an optimum setting condition for filtering.

Solution to Problem

A selection apparatus according to the present invention is an apparatus that selects a setting condition for filtering to be performed on a reading target, the selection apparatus including: a determiner that determines whether the reading target is readable with each of a plurality of combinations selected from among combinations of all setting conditions for at least two types of filtering; and a selector that selects a setting condition for the filtering based on a result of the determination by the determiner.

A selection method according to the present invention is a method for selecting a setting condition for filtering to be performed on a reading target, the selection method including: determining whether the reading target is readable with each of a plurality of combinations selected from among combinations of all setting conditions for at least two types of filtering; and selecting a setting condition for the filtering based on a result of the determining.

Advantageous Effects of Invention

According to the present invention, it is made possible to efficiently select an optimum setting condition for filtering.

DESCRIPTION OF EMBODIMENTS

Figure 1:
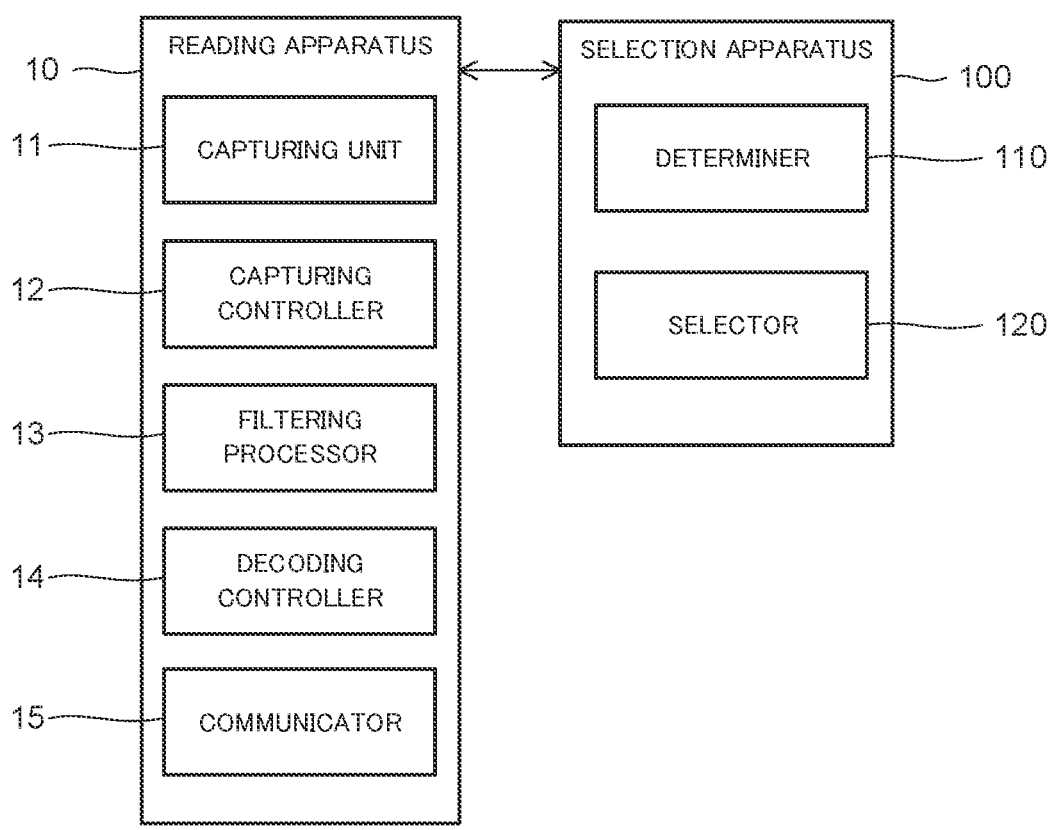
FIG. 1 is a block diagram illustrating a selection system to which a selection apparatus according to an embodiment of the present invention is applied.

Hereinafter, an embodiment of the present invention will be described in detail with reference to the accompanying drawings. FIG. 1 is a block diagram illustrating selection system 1 to which selection apparatus 100 according to an embodiment of the present invention is applied.

As illustrated in FIG. 1, selection system 1 is a code reader for reading a reading target, such as a bar code, and is a system capable of selecting a setting condition of filtering to be performed on the reading target. Selection system 1 includes reading apparatus 10 and selection apparatus 100.

Reading apparatus 10 includes a central processing unit (CPU), a read only memory (ROM), a random access memory (RAM), and an input/output circuit (these components are not illustrated), and is an apparatus that captures a reading target and decodes the captured reading target to read the reading target. Reading apparatus 10 includes capturing unit 11, capturing controller 12, filtering processor 13, decoding controller 14, and communicator 15.

Capturing unit 11 is a capturing device ((e.g., complementary metal-oxide semiconductor (CMOS) image sensor) or a charge coupled device (CCD) image sensor) for capturing a reading target.

Capturing controller 12 controls various capturing conditions in capturing unit 11, such as exposure time, black and white inversion, right and left inversion, and/or area designation. Capturing unit 11 captures an image of a reading target with a capturing condition controlled by capturing controller 12. Data of the image captured by capturing unit 11 is subjected to filtering by filtering processor 13 and temporarily held in a storage unit (not illustrated) and/or the like.

Filtering processor 13 performs filtering on the image (reading target) captured by capturing unit 11. The filtering is performed to optimize a reading condition (capturing condition) in reading apparatus 10. Filtering processor 13 performs at least two types of filtering. Each filtering has an intensity level of a plurality of stages, and a setting condition of each filtering is selected by selection apparatus 100 to be described, hereinafter.

Examples of the types of filtering include dilation and erosion. In the present embodiment, it is assumed that filtering processor 13 performs two types of filtering, i.e., dilation and erosion, but filtering processor 13 may perform three or more types of filtering including the dilation and erosion and another filtering.

Decoding controller 14 reads out the data of the image held in the storage unit and/or the like and decodes a bar code from the image based on to a predetermined decoding condition. Decoding controller 14 transmits information on the decoded bar code to an external device via communicator 15.

Selection apparatus 100 includes a CPU, ROM, RAM and an input/output circuit (these components are not illustrated) and is an apparatus for selecting a setting condition of filtering performed by filtering processor 13 described above. Selection apparatus 100 may be an apparatus outside of reading apparatus 10 (e.g., personal computer (PC)) or may be provided within reading apparatus 10. Selection apparatus 100 includes determiner 110 and selector 120.

Determiner 110 determines whether the reading target decoded by decoding controller 14 is readable. More specifically, determiner 110 determines whether the reading target is readable with each of four (plural) combinations selected from combinations of all setting conditions in the two types of filtering.

Figure 2:
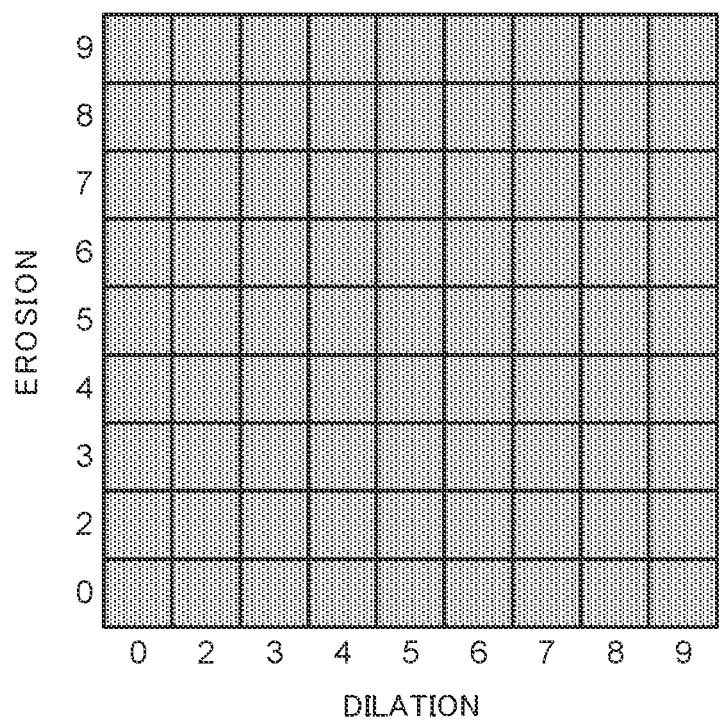
FIG. 2 is a diagram illustrating an example of a two-dimensional coordinate system.

More specifically, determiner 110 generates a two-dimensional coordinate system with each setting condition of the two types of filtering as a variable as illustrated in FIG. 2. In the two-dimensional coordinate system illustrated in FIG. 2, variables on the abscissa axis represent intensity levels of dilation and variables on the ordinate axis represent intensity levels of erosion. Each intensity level is indicated within a range of 0 to 9, both inclusive, for example, and 81 combinations in total are present for all of the setting conditions.

Figure 3:
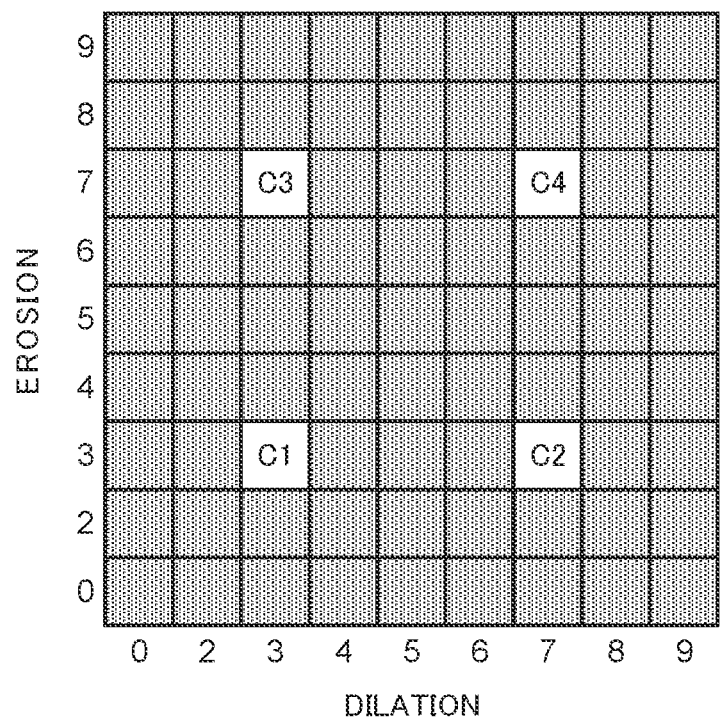
FIG. 3 is a diagram illustrating examples of four points selected in first determination processing.

As illustrated in FIG. 3, determiner 110 selects four combinations in the two-dimensional coordinate system such that the points on the four combinations are distant from each other by more than a predetermined distance.

Examples of the four combinations include such combinations that the points on the respective combinations spread in a square shape in a two-dimensional coordinate system, for example. That is, determiner 110 selects four combinations such that the points on the four combinations spread in a square shape in a two-dimensional coordinate system. In the present embodiment, four points of C1, C2, C3, and C4 are illustrated as four combinations. C1 represents a point where bright areas intensity level of dilation is 3 and dark areas intensity level of dilation is 3. C2 represents a point where bright areas intensity level of dilation is 7 and dark areas intensity level of dilation is 3. C3 represents a point where bright areas intensity level of dilation is 3 and dark areas intensity level of dilation is 7. C4 represents a point where bright areas intensity level of dilation is 7 and dark areas intensity level of dilation is 7. The length of one side of the square formed by C1, C2, C3, and C4, that is, the predetermined distance (difference in intensity level between adjacent two points) is 4.

Determiner 110 performs first determination processing that determines whether or not the reading target is readable with the setting conditions of the four combinations.

Determiner 110 performs second determination processing based on a combination that has been determined that the reading target is readable in the first determination processing described above.

In this second determination processing, determiner 110 selects, in the two-dimensional coordinate system, a point on a combination different from the combination determined to be readable in the first determination processing. Then, determiner 110 determines whether or not the reading target is readable based on the combination on the selected point.

When determining that the number of combinations with which the reading target is readable is one in the first determination processing, for example, determiner 110 selects, in the in second determination processing, a combination different from the combination in the first determination processing from among points surrounding the one point in the two-dimensional coordinate system.

Figure 4:
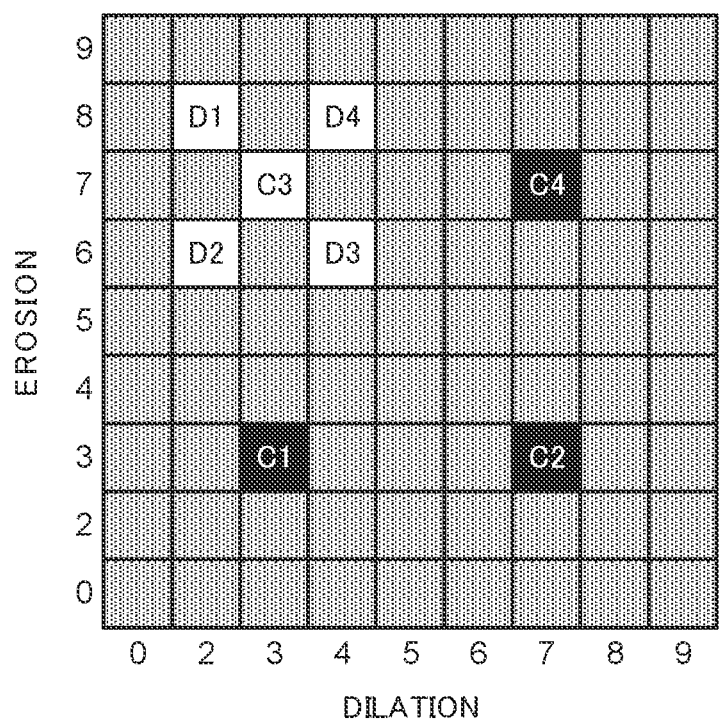
FIG. 4 is a diagram illustrating examples of four points selected in second determination processing.

It is assumed that only C3 among the four points is determined to be readable by determiner 110 as illustrated in FIG. 4, for example. In this case, determiner 110 selects a plurality of points from among the eight points surrounding C3. Determiner 110 selects four points, namely, D1, D2, D3, and D4, for example. Note that, the points indicated in black in FIG. 4 and subsequent drawings are setting conditions determined to be unreadable.

D1 is the diagonally-upper left point of C3, where bright areas intensity level of dilation is 2 and dark areas intensity level of dilation is 8. D2 is the diagonally-lower left point of C3, where bright areas intensity level of dilation is 2 and dark areas intensity level of dilation is 6. D3 is the diagonally-lower right point of C3, where bright areas intensity level of dilation is 4 and dark areas intensity level of dilation is 6. D4 is the diagonally-upper right point of C3, where bright areas intensity level of dilation is 4 and dark areas intensity level of dilation is 8.

Determiner 110 determines whether the reading target is readable with each of the combinations of selected four points D1, D2, D3, and D4.

Selector 120 selects setting conditions of filtering based on results of the determination by determiner 110, that is, the results of the first determination processing and the second determination processing. More specifically, as illustrated in FIG. 5, selector 120 selects setting conditions of filtering in accordance with the number of points that have become reading targets among the four points, D1, D2, D3, and D4, each being a determination target in the second determination processing.

Figure 5:
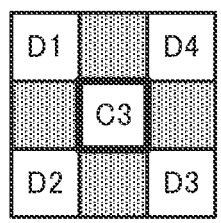
FIG. 5 is a diagram for describing a selection method for a setting condition in a selector.
Figure 5:
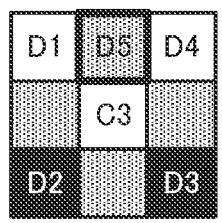
Figure 5:
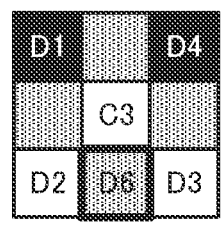
Figure 5:
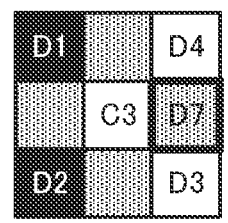
Figure 5:
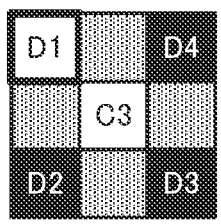
Figure 5:
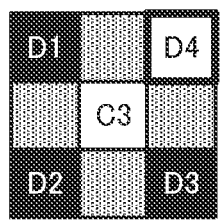
Figure 5:
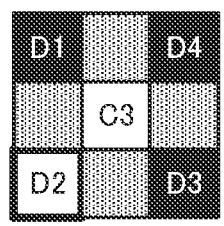
Figure 5:
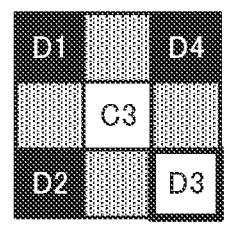

In a case where all of the four points, D1, D2, D3, and D4 are determined to be readable, for example, selector 120 selects the combination on C3, which is the center point of D1, D2, D3, and D4, as the setting conditions of filtering (upper leftmost figure in FIG. 5).

In a case where only two points of D1, D2, D3, and D4 are determined to be readable, selector 120 selects the combination on the center point of the two points as the setting conditions of filtering.

In a case where two points D1 and D4 are readable, for example, D5, which is the center point of D1 and D4, is selected as the setting conditions of filtering (second from upper leftmost figure in FIG. 5). Further, in a case where two points D2 and D3 are readable, D6, which is the center point of D2 and D3, is selected as the setting conditions of filtering (center figure of upper row in FIG. 5).

Further, in a case where two points D3 and D4 are readable, D7, which is the center point of D3 and D4, is selected as the setting conditions of filtering (second from the rightmost figure in FIG. 5). Further, in a case where two points D1 and D2 are readable, D8, which is the center point of D1 and D2, is selected as the setting conditions of filtering (upper rightmost figure in FIG. 5).

Further, in a case where only one point of D1, D2, D3, and D4 is determined to be readable, selector 120 selects the combination on the one point as the setting conditions of filtering (lower row in FIG. 5).

Further, when determining that the number of combinations with which a reading target is readable is two in the first determination processing, determiner 110 selects a combination different from the combinations in the first determination processing from among points surrounding the two center points relating the two points in the two-dimensional coordinate system.

Figure 6:
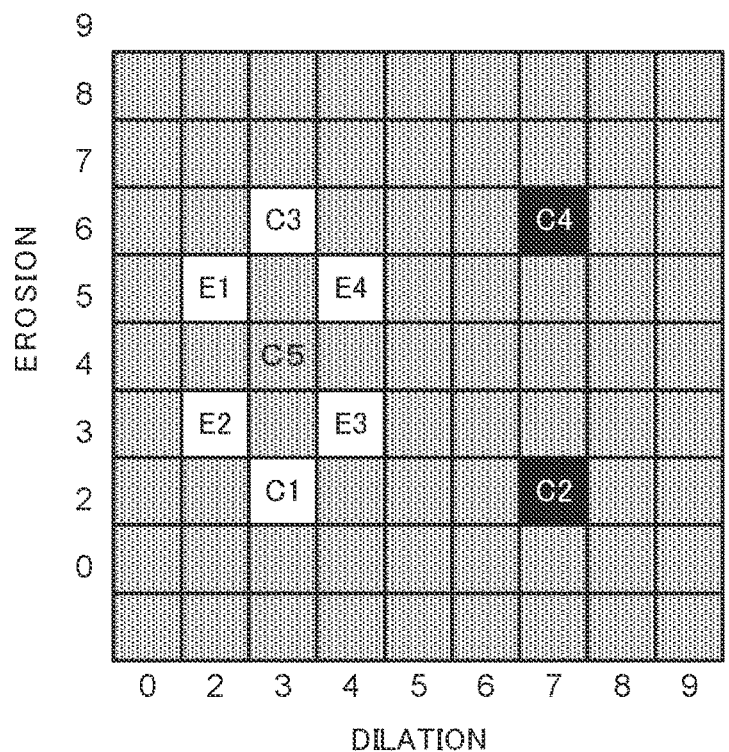
FIG. 6 is a diagram illustrating examples of four points selected in the second determination processing.

It is assumed that C1 and C3 among the four points are determined by determiner 110 to be readable as illustrated in FIG. 6, for example. In this case, determiner 110 selects a plurality of points from among the eight points surrounding C5, which is the center point of C1 and C3. C5 represents a point where bright areas intensity level of dilation is 3 and dark areas intensity level of dilation is 5. Determiner 110 selects, for example, four points, namely, E1, E2, E3, and E4

E1 is the diagonally-upper left point of C5, where bright areas intensity level of dilation is 2, and dark areas intensity level of dilation is 6. E2 is the diagonally-lower left point of C5, where bright areas intensity level of dilation is 2 and dark areas intensity level of dilation is 4. E3 is the diagonally-lower right point of C5, where bright areas intensity level of dilation is 4 and dark areas intensity level of dilation is 4. E4 is the diagonally-upper right point of C5, where bright areas intensity level of dilation is 4 and dark areas intensity level of dilation is 6.

Determiner 110 determines whether a reading target is readable with each of the combinations of selected four points E1, E2, E3, and E4.

The selection of setting conditions by selector 120 is performed in the same manner as in the case of D1, D2, D3, and D4 described above.

Further, when determining that the number of combinations with which the reading target is readable is three or more in the first determination processing, determiner 110 selects a plurality of points from among the eight points surrounding C6, which is the center point of the four points C1, C2, C3, and C4 in the two-dimensional coordinate system.

Figure 7:
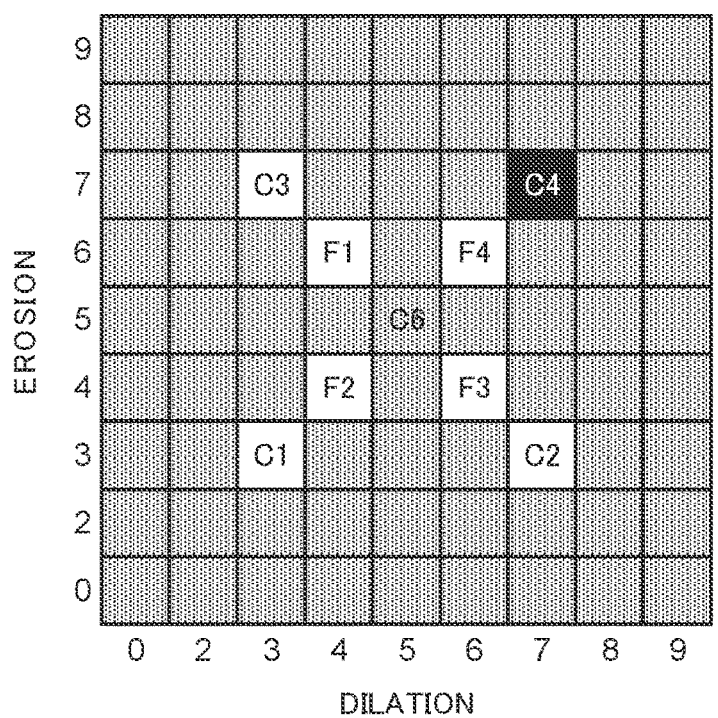
FIG. 7 is a diagram illustrating examples of four points selected in the second determination processing.

It is assumed that C1, C2, and C3 among the four points are determined to be readable by determiner 110 as illustrated in FIG. 7, for example. Determiner 110 selects four points, F1, F2, F3, and F4.

F1 is the diagonally-upper left point of C6, where bright areas intensity level of dilation is 4 and dark areas intensity level of dilation is 6. F2 is the diagonally-lower left point of C6, where bright areas intensity level of dilation is 4 and dark areas intensity level of dilation is 4. F3 is the diagonally-lower right point of C6, where bright areas intensity level of dilation is 6 and dark areas intensity level of dilation of erosion is 4. F4 is the diagonally-upper right point of C6, where bright areas intensity level of dilation is 6 and dark areas intensity level of dilation is 6.

Determiner 110 determines whether the reading target is readable with each of the combinations of selected four points F1, F2, F3, and F4.

The selection of setting conditions by selector 120 is performed in the same manner as in the case of D1, D2, D3, and D4 described above.

Further, in a case where there is no combination with which the reading target is readable in the first determination processing, determiner 110 may select a point different from the points on the plurality of combinations in the two-dimensional coordinate system and repeat the first determination processing.

Figure 8:
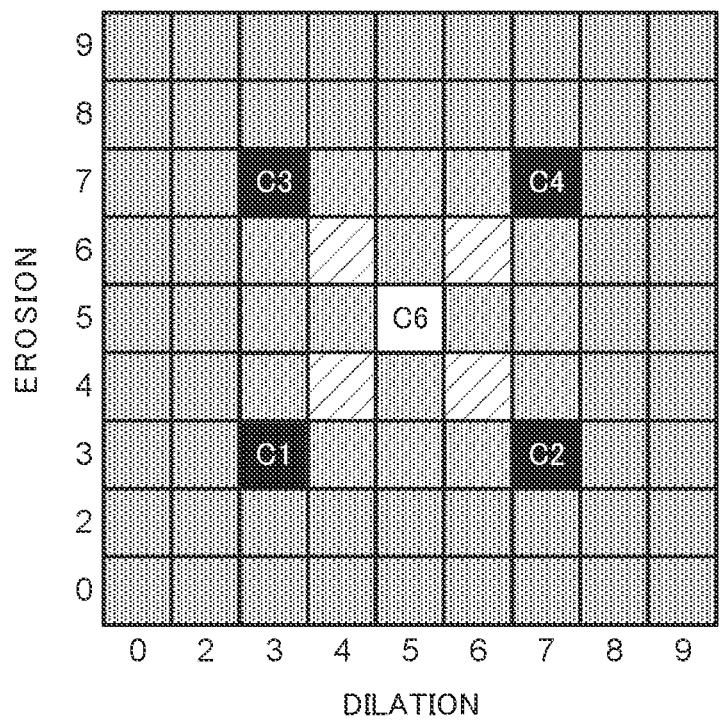
FIG. 8 is a diagram for describing a support example for a case where four points in the first determination processing are unreadable.

Determiner 110 selects, for example, C6, which is the center point of the four points C1, C2, C3, and C4 in the two-dimensional coordinate system, and determines whether or not the reading target is readable as illustrated in FIG. 8.

When determining that the reading target is readable with the setting conditions of C6, determiner 110 selects a plurality of points (e.g., F1, F2, F3, and F4) from among the eight points surrounding C6 as in the method indicated in FIG. 7, for example, and determines whether or not the reading target is readable with each of the combinations on the selected plurality of points.

Figure 9:
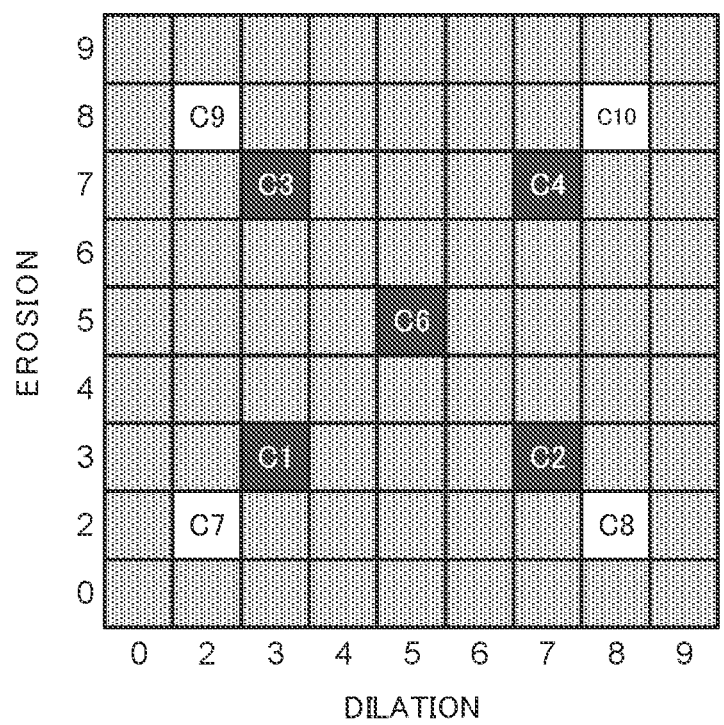
FIG. 9 is another diagram for describing the support example for a case where four points in the first determination processing are unreadable.

Further, when determining that the reading target is unreadable with the setting conditions of C6, determiner 110 selects a plurality of points different from the four points C1, C2, C3, and C4, and determines whether the reading target is readable with each of the plurality of points. Determiner 110 may select C7, C8, C9, and C10 as a plurality of different points, for example, as illustrated in FIG. 9.

C7 represents a point where bright areas intensity level of dilation is 2 and dark areas intensity level of dilation of erosion is 2. C8 represents a point where bright areas intensity level of dilation is 8 and dark areas intensity level of dilation is 2. C9 represents a point where bright areas intensity level of dilation is 2 and dark areas intensity level of dilation is 8. C10 represents a point where bright areas intensity level of dilation is 8 and dark areas intensity level of dilation is 8. The length of one side of the square formed by C7, C8, C9, and C10, that is, the predetermined distance (difference in intensity level between adjacent two points) is 6.

Note that, determiner 110 may repeat the first determination processing with each of the four points C7, C8, C9, and C10 without performing determination processing with C6, which is the center point.

Figure 10:
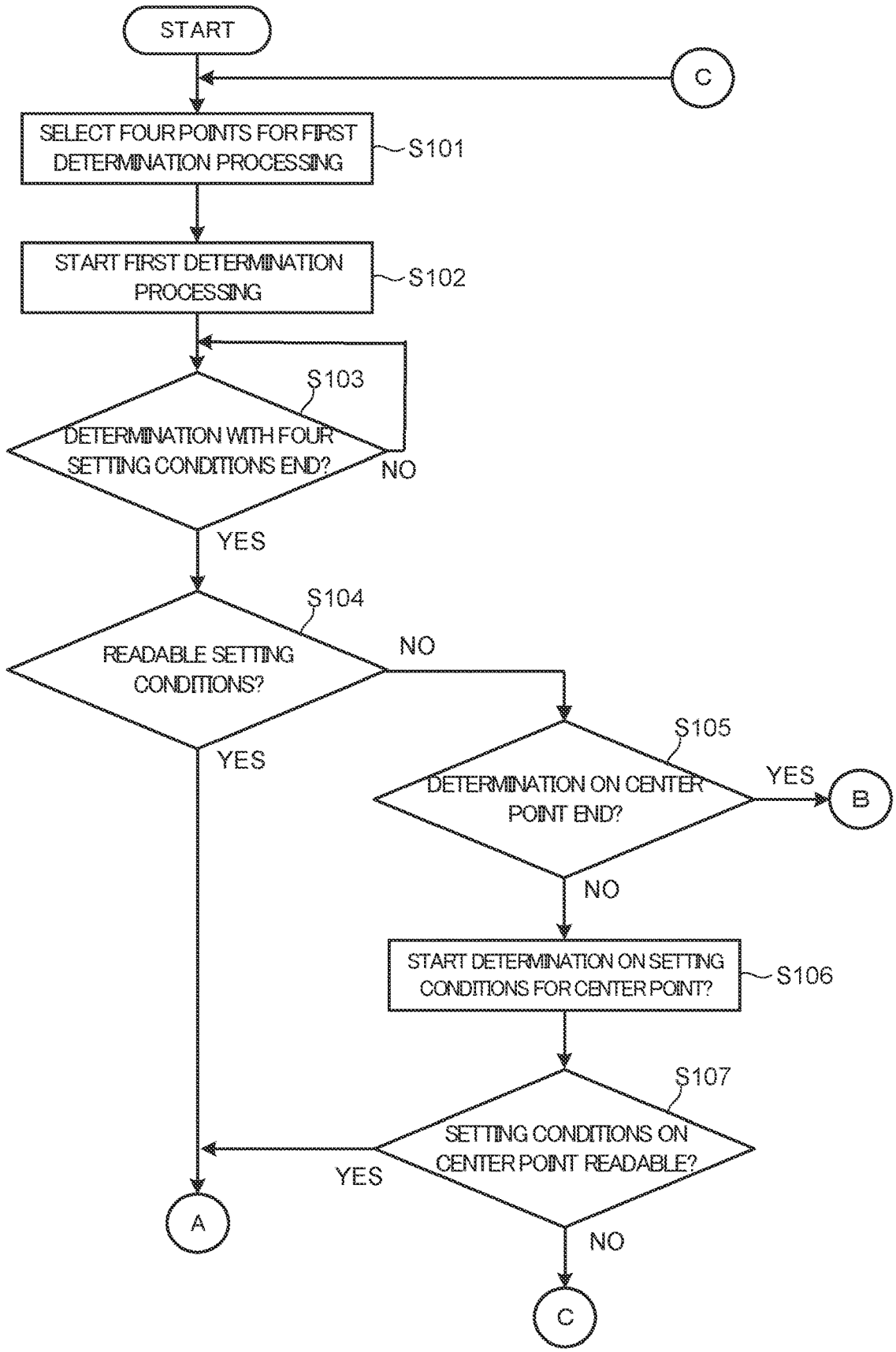
FIG. 10 is a flowchart illustrating an operation example of selection control in the selection apparatus.
Figure 11:
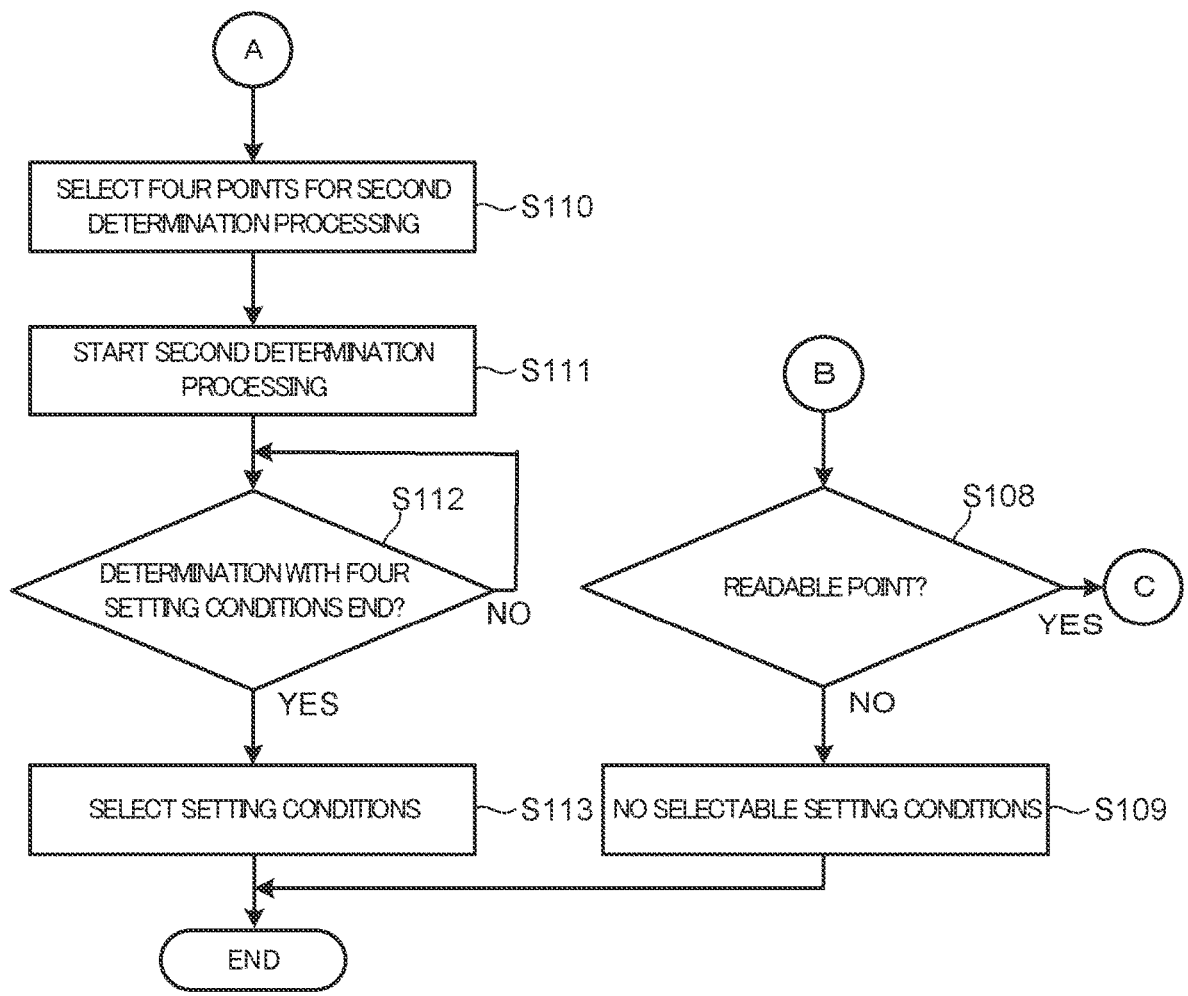
FIG. 11 is a flowchart illustrating the operation example of the selection control in the selection apparatus.

Next, a description will be given of an operation example when selection control in selection apparatus 100 is performed. FIGS. 10 and 11 are flowcharts illustrating an operation example of the selection control in selection apparatus 100. The processing illustrated in FIGS. 10 and 11 is executed as appropriate when image data, which is a reading target, is transmitted to selection apparatus 100 by capturing unit 11 of reading apparatus 10, for example.

As illustrated in FIG. 10, selection apparatus 100 selects four points in a two-dimensional coordinate system for first determination processing (step S101). After selecting four points, selection apparatus 100 starts the first determination processing (step S102).

Next, selection apparatus 100 determines whether or not determination with four setting conditions is completed (step S103). In a case where the determination with four setting conditions is not completed, as a result of the determination (NO in step S103), the process of step S103 is repeated.

Meanwhile, in a case where the determination with four setting conditions is completed (YES in step S103), selection apparatus 100 determines whether or not there are setting conditions with which the reading target is readable among the four setting conditions (step S104).

In a case where there is no setting condition with which reading is possible as a result of the determination (NO in step S104), selection apparatus 100 determines whether or not determination for the center point of the four points is completed (step S105).

In a case where the determination for the center point is not completed, as a result of the determination (NO in step S105), selection apparatus 100 starts determination processing for setting conditions of the center point (step S106). After the determination processing for the setting conditions is completed, selection apparatus 100 determines whether or not reading is possible with setting conditions of the center points (step S107).

In a case where reading is possible with the setting conditions of the center point (YES in step S107), the processing transitions to step S110. Meanwhile, in a case where reading is not possible with the setting conditions of the center point (NO in step S107), the processing returns to step S101.

Returning to determination in step S105, in a case where the determination of the center point is completed (YES in step S105), selection apparatus 100 determines whether a selectable point is present as illustrated in FIG. 11 (YES in step S108).

In a case where there is a selectable point, as a result of the determination (YES in step S108), the processing returns to step S101. Meanwhile, in a case where there is no selectable point (NO in step S108), selection apparatus 100 determines that there is no selectable setting condition (step S109), and this control ends. Note that, announcement indicating that the reading target cannot be read and/or the reading target is captured again may be made in step S109, for example.

Return to determination in step S104 in FIG. 10, in a case where there are setting conditions with which reading is possible (YES in step S104), selection apparatus 100 selects four points for the second determination processing (step S110) as illustrated in FIG. 11. After selecting four points, selection apparatus 100 starts the second determination processing (step S111).

Next, selection apparatus 100 determines whether or not determination with the four setting conditions is completed (step S112). In a case where the determination with the four setting conditions is not completed, as a result of the determination (NO in step S112), the process of step S112 is repeated.

Meanwhile, in a case where determination with the four setting conditions is completed (YES in step S112), selection apparatus 100 selects setting conditions (step S113). This control then ends.

According to the present embodiment with the configuration described above, whether a reading target is readable with each of a plurality of combinations selected from among combinations of all setting conditions in two types of filtering is determined, and setting conditions for the filtering are selected based on a result of the determination.

Thus, optimum setting conditions for the filtering are efficiently selectable in comparison with the configuration in which whether a reading target is readable is determined with combinations of all setting conditions.

Further, determination processing is performed while selecting a plurality of combinations distant from each other by a predetermined distance or greater in a two-dimensional coordinate system; thus, it is made possible to narrow down a region with optimum setting conditions in the two-dimensional coordinate system.

In addition, the points on a plurality of combinations spreading in a square shape in a two-dimensional coordinate system are selected; thus, four points distant from each other to some extent in a two-dimensional coordinate system are effectively selectable.

Reading with combinations of all setting conditions results in performing reading 81 time; however, in this embodiment, reading is performed 4 times in the first determination processing and reading is performed 4 times in the second determination processing, so that optimum setting conditions are selectable by performing reading 8 times at minimum. In other words, performing the first determination processing and the second determination processing makes it easier to further narrow down optimum setting conditions; thus, making it possible to efficiently select optimum setting conditions for filtering.

Note that, in the embodiment described above, a plurality of combinations spreading in a square shape in a two-dimensional coordinate system is selected, but the present invention is not limited to this, and a plurality of combinations not spreading in a square shape in a two-dimensional coordinate system may be selected.

Further, in the present embodiment, selector 120 selects setting conditions for filtering based on results of the first determination processing and the second determination processing, but the present invention is not limited to this. A combination that has been determined to be readable as a result of the first determination processing may be selected as the setting conditions for filtering, for example.

In the present embodiment, although determiner 110 performs the first determination processing and the second determination processing, the present invention is not limited to this, and third determination processing may be performed after the first determination processing and second determination processing, for example.

The third determination processing is processing of selecting a point on a combination different from combinations determined to be readable in the first determination processing and the second determination processing in a two-dimensional coordinate system, and determining whether the reading target is readable, based on the combination on the selected point.

The point selected in the third determination processing is a point based on a point determined to be readable in the second determination processing. A selection method for a point in the third determination processing may be the same method as the selection method for a point in the second determination processing, for example, or may be another method.

Determiner 110 performs the third determination processing when selector 120 does not select any setting condition for filtering based on the results of the first determination processing and the second determination processing. Examples of cases where selector 120 does not select any setting condition for filtering include a case where setting conditions based on the determination processing do not meet a predetermined criterion (optionally settable) and a case where a region where a point is selectable still exists in the two-dimensional coordinate system.

Selector 120 then selects setting conditions for filtering based on a result of the third determination processing.

Accordingly, it is made easier to further narrow down a region with optimum setting conditions in a two-dimensional coordinate system.

Determiner 110 may further perform the third determination processing when no setting conditions for filtering are yet selected by selector 120. That is, determiner 110 may repeat the third determination processing until setting conditions for filtering are selected by selector 120.

The point to be selected in the third determination processing of the second time and thereafter is a point based on the point selected in the previous third determination processing.

Accordingly, it is made easier to further narrow down a region with optimum setting conditions in a two-dimensional coordinate system.

In the embodiment described above, determiner 110 selects a plurality of combinations from a two-dimensional coordinate system, but the present invention is not limited to this, and the determination processing may be performed by acquiring a plurality of combinations selected by another apparatus, and using the plurality of combinations.

In the embodiment described above, four points in a two-dimensional coordinate system are selected as a plurality of combinations, but the present invention is not limited to this, and the number of points other than four may be selected.

In the embodiment described above, a bar code is exemplified as an example of the reading target, but the present invention is not limited to this, and the reading target may be one other than a bar code.

INDUSTRIAL APPLICABILITY

The selection apparatus of the present invention is useful as a selection apparatus and a selection assisting method each capable of efficiently selecting an optimum setting condition for filtering.

REFERENCE SIGNS LIST

1 Selection system
10 Reading apparatus
11 Capturing unit
12 Capturing controller
13 Filtering processor
14 Decoding controller
15 Communicator
100 Selection apparatus
110 Determiner
120 Selector

What is claimed is:

1. A selection apparatus that selects a setting condition for filtering to be performed on a reading target, the selection apparatus comprising:
a determiner that determines whether the reading target is readable with each of a plurality of combinations selected from among combinations of all setting conditions for at least two types of filtering; and
a selector that selects a setting condition for the filtering based on a result of the determination by the determiner.

2. The selection apparatus according to claim 1, wherein the determiner selects the plurality of combinations such that points on the plurality of combinations are distant from each other by a predetermined distance or greater in a two-dimensional coordinate system with the setting conditions for the two types of filtering as variables.

3. The selection apparatus according to claim 2, wherein the determiner selects the plurality of combinations such that the points on the plurality of combinations spread in a square shape in the two-dimensional coordinate system.

4. The selection apparatus according to claim 2, wherein the determiner performs
first determination processing in which whether the reading target is readable with each of the plurality of combinations is determined, and
second determination processing in which a point on a combination different from one or more of the plurality of combinations with which the reading target has been determined to be readable is selected in the two-dimensional coordinate system, and whether the reading target is readable is determined based on the combination on the selected point, and wherein
the selector selects a setting condition for the filtering based on results of the first determination processing and the second determination processing.

5. The selection apparatus according to claim 4, wherein the determiner performs, after the first determination processing and the second determination processing, third determination processing in which whether the reading target is readable is determined based on a combination different from the one or more of the plurality of combinations with which the reading target has been determined to be readable in the first determination processing and the second determination processing, and
when none of the setting conditions for the filtering based on the results of the first determination processing and the second determination processing is selected by the selector, the determiner repeats the third determination processing until a setting condition for the filtering is selected by the selector.

6. The selection apparatus according to claim 4, wherein, when determining that a number of combinations with which the reading target is readable is one in the first determination processing, the determiner selects, in the second determination processing, the different combination from among points surrounding a point on the one combination in the two-dimensional coordinate system.

7. The selection apparatus according to claim 4, wherein, when determining that a number of combinations with which the reading target is readable is two in the first determination processing, the determiner selects, in the second determination processing, the different combination from among points surrounding a center point between two points on the two combinations in the two-dimensional coordinate system.

8. The selection apparatus according to claim 4, wherein, when the reading target is readable with none of the plurality combinations in the first determination processing, the determiner selects a point different from the points on the plurality of combinations in the two-dimensional coordinate system and repeats the first determination processing.

9. A selection method for selecting a setting condition for filtering to be performed on a reading target, the selection method comprising:
determining whether the reading target is readable with each of a plurality of combinations selected from among combinations of all setting conditions for at least two types of filtering; and selecting a setting condition for the filtering based on a result of the determining.

* * * * *